(12) United States Patent
Kreines et al.

(10) Patent No.: US 11,836,471 B2
(45) Date of Patent: Dec. 5, 2023

(54) METHODS FOR PRIORITIZING UPDATES FOR VEHICLE FLEETS

(71) Applicant: RedBend, Ltd., Hod Hasharon (IL)

(72) Inventors: Alexander Kreines, Jerusalem (IL); Shachar Mendelowitz, Tel Aviv (IL); Nir Morgulis, Petah Tikwa (IL); Nurit Peres, Herzliya (IL)

(73) Assignee: RED BEND LTD., Hod Ha'sharon (IL)

(\*) Notice: Subject to any disclaimer, the term of this patent is extended or adjusted under 35 U.S.C. 154(b) by 333 days.

(21) Appl. No.: 17/076,655

(22) Filed: Oct. 21, 2020

(65) Prior Publication Data

US 2022/0121435 A1   Apr. 21, 2022

(51) Int. Cl.
  *G06F 8/65*      (2018.01)
  *G01C 21/34*     (2006.01)
  *G01C 21/36*     (2006.01)
  *G05D 1/02*      (2020.01)
  *H04L 9/40*      (2022.01)
  *G06F 21/50*     (2013.01)

(52) U.S. Cl.
  CPC .......... *G06F 8/65* (2013.01); *G01C 21/3453* (2013.01); *G01C 21/3691* (2013.01); *G05D 1/0212* (2013.01); *G05D 1/0291* (2013.01); *G06F 21/50* (2013.01); *H04L 63/1433* (2013.01)

(58) Field of Classification Search
  CPC ...... G06F 16/24578; G06F 8/65; G06F 21/50; G01C 21/3453; G01C 21/3691; G05D 1/0212; G05D 1/0291; H04L 63/1433
  See application file for complete search history.

(56) References Cited

U.S. PATENT DOCUMENTS

| 10,310,842 | B1* | 6/2019 | Miller | G06F 8/65 |
| 2015/0177842 | A1 | 6/2015 | Rudenko | |
| 2016/0301709 | A1* | 10/2016 | Hassanzadeh | H04L 63/1425 |
| 2016/0371077 | A1* | 12/2016 | Moeller | G06F 8/654 |
| 2020/0394310 | A1* | 12/2020 | Sloane | G06F 8/65 |
| 2021/0224582 | A1* | 7/2021 | Afshar | G06Q 30/0623 |
| 2021/0374201 | A1* | 12/2021 | Wu | G06F 18/24143 |
| 2022/0138041 | A1* | 5/2022 | Degrass | G06F 11/0709 |
| | | | | 714/38.1 |

OTHER PUBLICATIONS

Daniel Fowler et al.; Vehicular Over-the-air Software Upgrade Threat Modeling; researchgate; 27 pages; retrieved on Jun. 7, 2023 (Year: 2022).*
Marco Steger et al.; SecUp: Secure and Efficient Wireless Software Updates for Vehicles; IEEE; pp. 628-636; retrieved on Jun. 7, 2023 (Year: 2016).*
European Patent Office, Extended European Search Report Issued in Application No. 21202564.7, dated Jun. 30, 2022, Germany, 10 pages.

\* cited by examiner

*Primary Examiner* — S. Sough
*Assistant Examiner* — Cuong V Luu
(74) *Attorney, Agent, or Firm* — McCoy Russell LLP (57) ABSTRACT

Mechanisms and methods are provided for establishing vectors indicating the presence, in a first vehicle and second vehicle, of a super-set of vehicle features present across a fleet of vehicles. The first vehicle may be a reference vehicle. A distance function of the vectors may be calculated in order to establish a similarity score indicating the degree of similarity between the designs of the two vehicles. If the second vehicle is sufficiently similar to the reference vehicle, a software update may be recommended and applied.

18 Claims, 10 Drawing Sheets

METHODS FOR PRIORITIZING UPDATES FOR VEHICLE FLEETS

FIELD

The disclosure relates to improving in-field software updating of vehicles, including fleets of vehicles.

BACKGROUND

Electronic systems employing software are widespread in the automobiles, and the uses to which they are put in vehicles are constantly expanding. Meanwhile, vehicles in use may encounter security issues or safety issues pertaining to their electronic systems, which may be addressable through software updates.

Software of individual vehicles may be relatively easily updated, such as by taking the individual vehicles into a repair shop. However, for a fleet of vehicles, which may number in the thousands or even in the tens of thousands, management of software updates (such as software updates, firmware updates, and security patches) across the fleet may be resource intensive. Planning for and managing the software updates across the fleet may itself be time consuming and may potentially require manual review of available information. Building a prioritized plan for software updates, and performing the software updates, may accordingly be very difficult, and potentially not feasible. This may leave fleets of vehicles without software updates to protect them against emerging security threats and safety problems, and may also leave update systems overly loaded.

SUMMARY

Disclosed herein are methods and mechanisms for updating applications for electronic systems of vehicles, which may be well-suited to address the problems of keeping applications well-updated across fleets of vehicles. When an issue is observed related to a reference vehicle—for example, a safety problem, or a recently-observed type of attack, or a newly-discovered security vulnerability—a recommendation system may comprehensively analyze the hardware configurations, hardware versions, software configurations, and software versions of vehicles in the fleet to determine which vehicles may be most similar to the reference vehicle. Those vehicles may subsequently be prioritized for receiving appropriate software updates.

In some embodiments, which may be related to security vulnerabilities, a recommendation system may take into account specific attack paths between "attack surfaces" of the vehicle (e.g., interfaces which may be vulnerable to infiltration, which may also be referred to herein as "entry points" or "attack entry points") and the various electronic devices of a vehicle. Accordingly, the recommendation systems may take into account which vehicles in a fleet of vehicles have attack paths that are similar to the attack paths of a reference vehicle.

For example, if a security vulnerability is detected on a software component of a vehicle, the recommendation system may determine which vehicles in the fleet have that software component and may prioritize those vehicles for updating, or may determine which of those vehicles may be most vulnerable (e.g., because they share the relevant attack path with the reference vehicle) and may prioritize those vehicles.

In some embodiments, the issues described above may be addressed by establishing a vector of weighted presences of a comprehensive set of vehicle features in a reference vehicle, and establishing a second vector of weighted presences of the comprehensive set of vehicle features in a second vehicle. A distance function, such as an inner product of the vectors, may be calculated to establish a similarity score between the first and second vehicles, and an action (e.g., a software update, firmware update, or security patch) may be recommended for the second vehicle based at least in part upon the similarity score. In this way, the degree to which the first vehicle resembles the second vehicle may be analyzed, and action taken based upon how similar the vehicles are.

For some embodiments, the issues described above may be addressed by establishing a first vector of weighted presences of a set of vehicle features in a reference vehicle, and establishing a set of second vectors of weighted presences of the set of vehicle features across a fleet of vehicles. A distance (e.g., a distance function) between the first vector and the set of second vectors may be calculated to establish a set of similarity scores between the reference vehicle and the fleet of vehicles, and a set of actions may be taken for the fleet of vehicles based at least in part upon the set of similarity scores. In this way, the degree to which each vehicle across a fleet of vehicles is similar to a reference vehicle may be analyzed, and action (such as software updates, firmware updates, and security patches) may be taken depending upon which vehicles of the fleet are sufficiently similar to the reference vehicle.

In some embodiments, a first vector including weighted presences of a set of vehicle features in a first vehicle may be established, and a second vector of weighted presences of the set of vehicle features in a second vehicle may also be established. The set of vehicle features may include one or more possible attack paths between a set of attack surfaces, and a set of potential target devices, such as Electronic Control Units (ECUs). A distance between the first vector and the second vector may be calculated (e.g., based on differences between the first vector and the second vector) to establish a similarity score between the first vehicle and the second vehicle, and an action for the second vehicle may be recommended at least in part upon the similarity score. In this way, similarities between specific attack paths through hardware components may be used to find and prioritize vehicles within a fleet for receiving updates.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
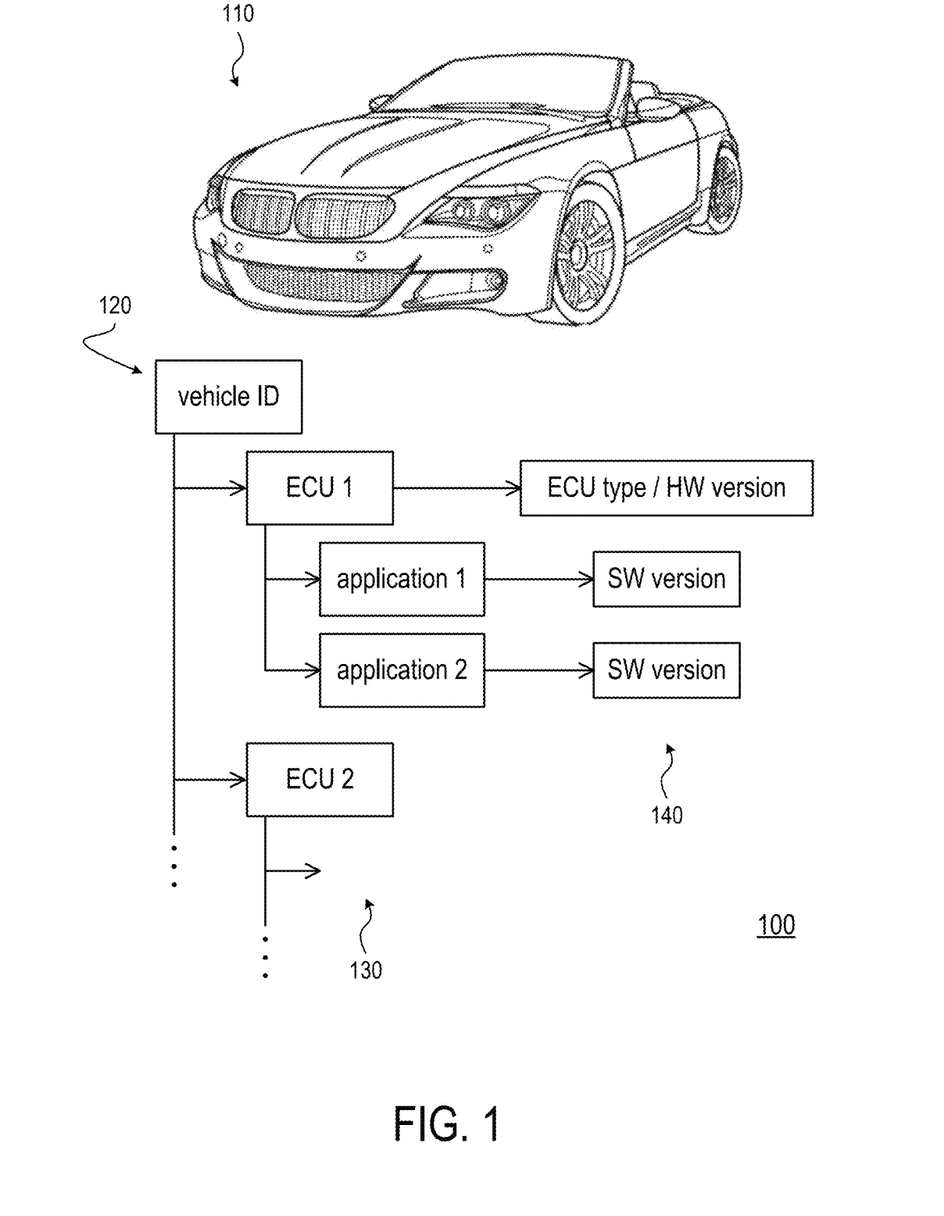
FIG. 1 illustrates a relationship between a vehicle and an associated record, the entries of which may contain a set of features that are present in the vehicle, in accordance with one or more embodiments of the present disclosure.
Figure 2:
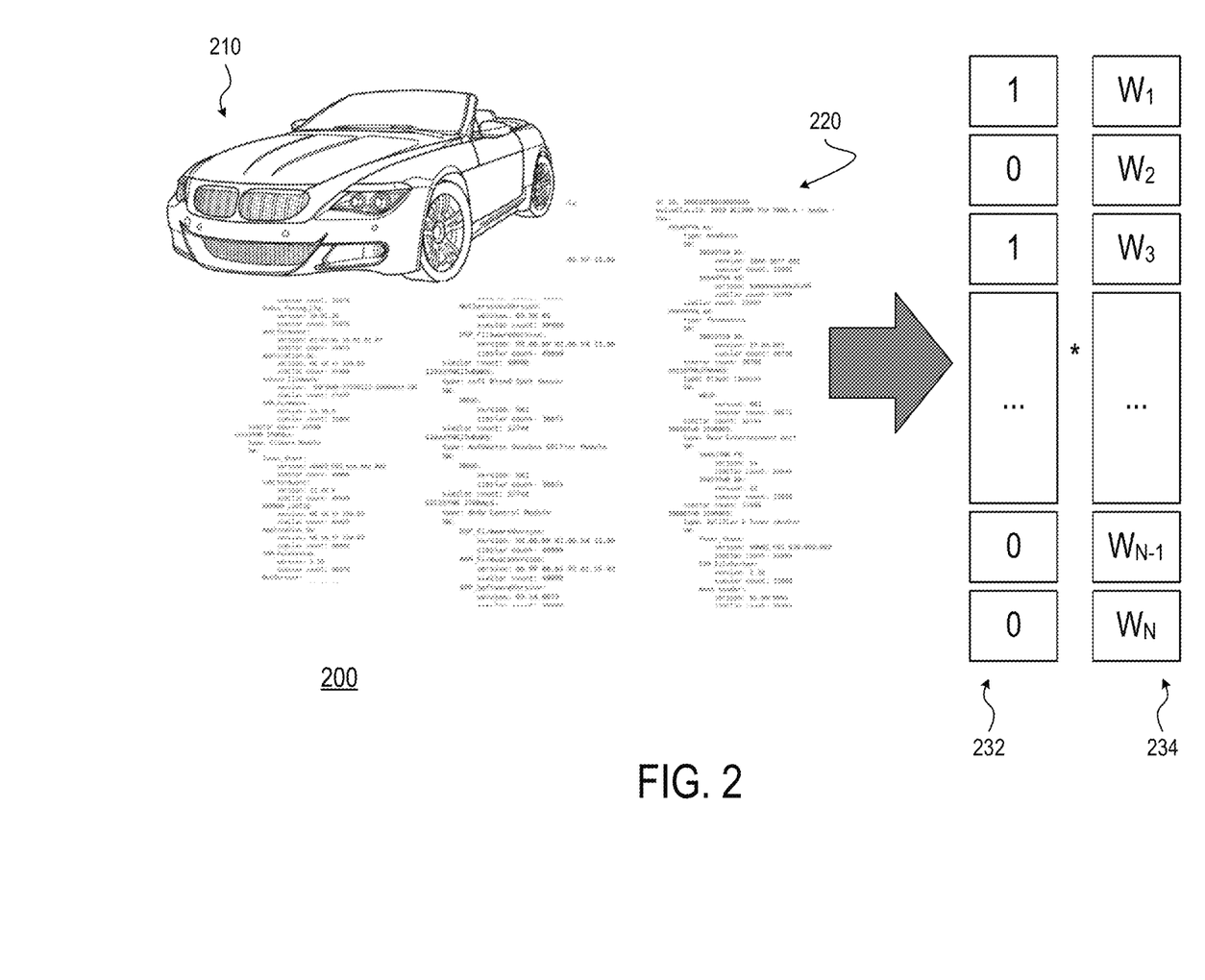
FIG. 2 illustrates a relationship between a vehicle, a record, a first vector, and a second vector, in accordance with one or more embodiments of the present disclosure.
Figure 3:
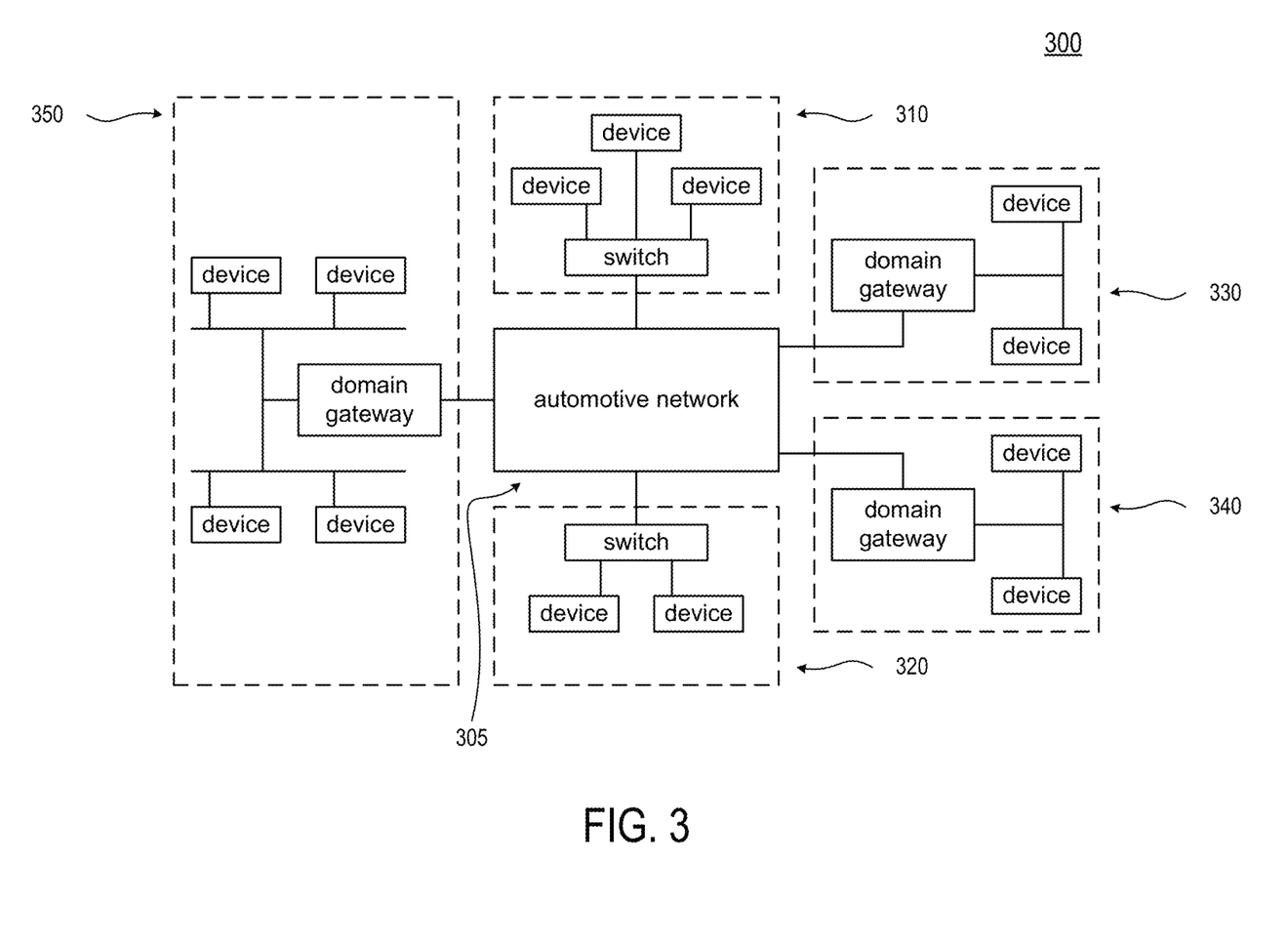
FIG. 3 shows a block diagram of an internal network topology of a vehicle, in accordance with one or more embodiments of the present disclosure.
Figure 4:
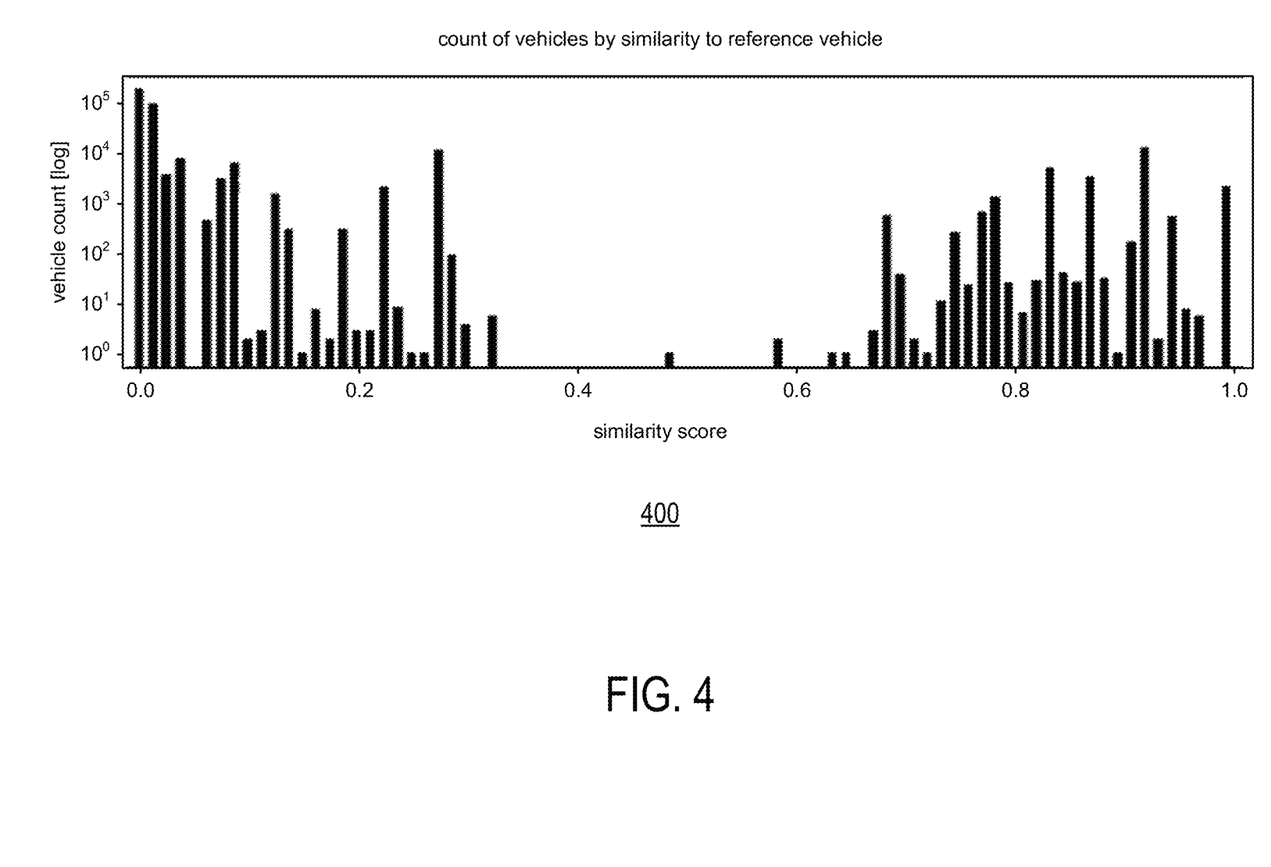
FIG. 4 shows a chart of similarity scores between a reference vehicle and other vehicles of a fleet, using a first analytical mode, in accordance with one or more embodiments of the present disclosure.
Figure 5:
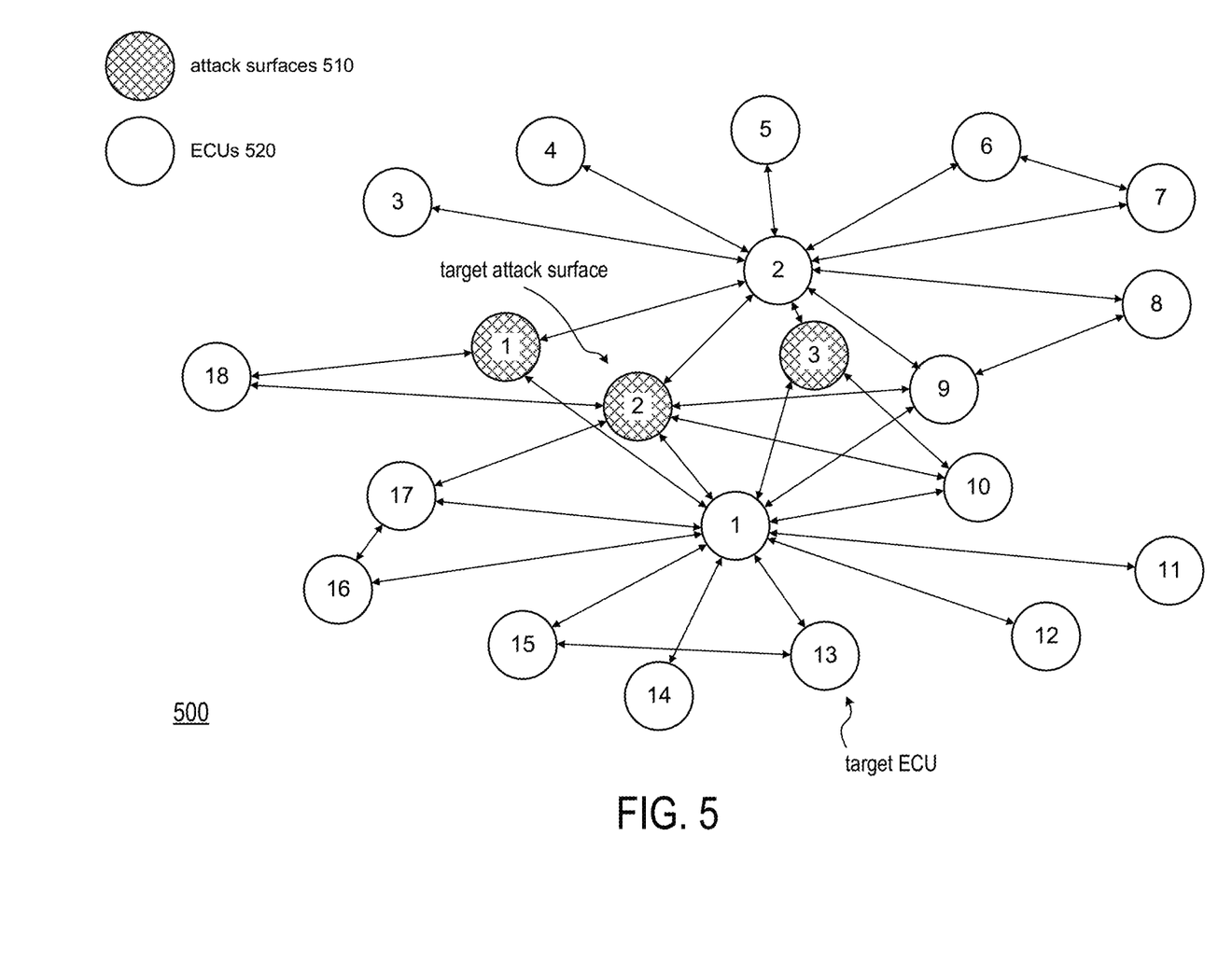
FIG. 5 shows an interconnection diagram for a network topology of a vehicle network, in accordance with one or more embodiments of the present disclosure.
Figure 6:
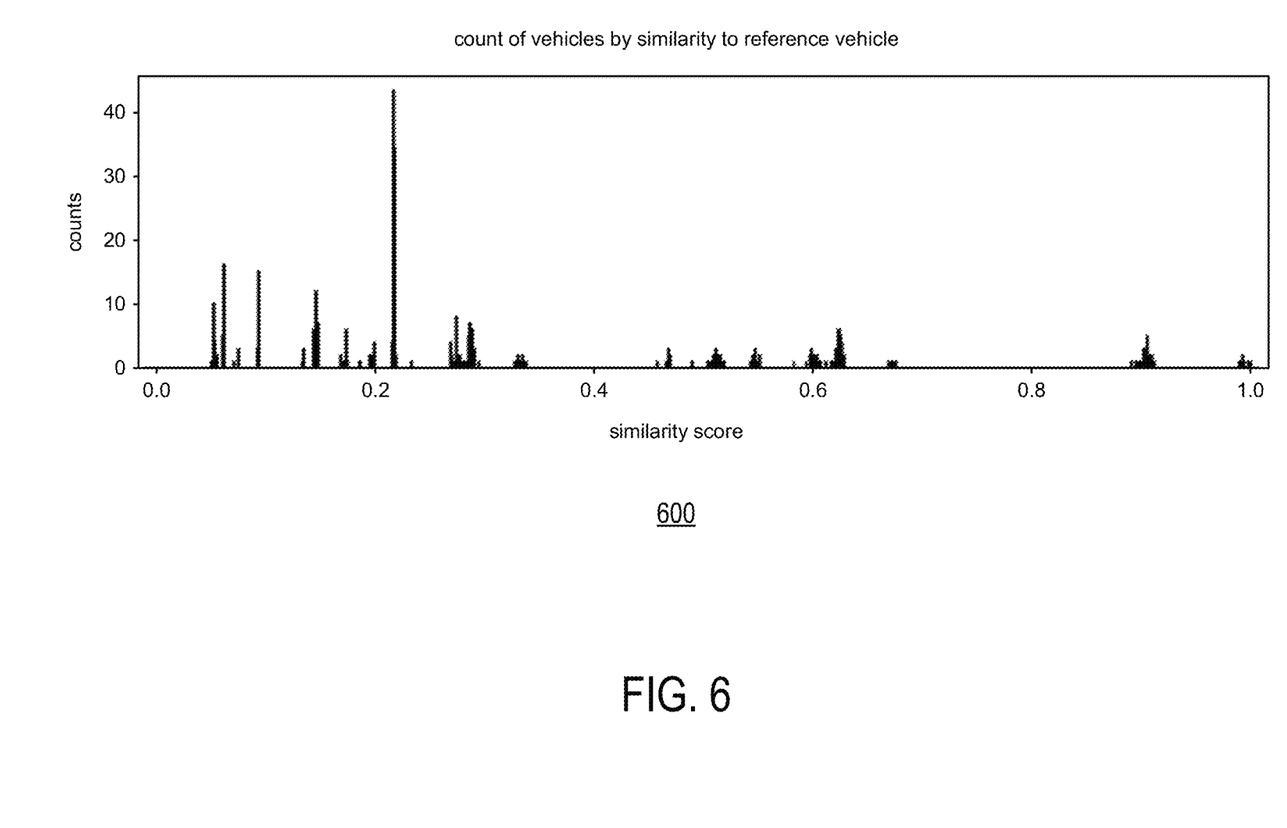
FIG. 6 shows a chart of similarity scores between a reference vehicle and other vehicles of the fleet, using a second analytical mode, in accordance with one or more embodiments of the present disclosure.

Disclosed herein are mechanisms and methods for establishing similarity scores among vehicles within a fleet of vehicles, which may then be used to prioritize software updates or application updates to the vehicles in the fleet (e.g., software updates, firmware updates, security patches, and so on). FIGS. 1 and 2 illustrate relationships between vehicles, records carrying information about vehicle features, and vectors based upon the records. FIG. 3 shows a block diagram of an internal network topology of a vehicle related to the records and vectors of FIGS. 1 and 2. FIG. 4 shows a chart of similarity scores between a reference vehicle and the other vehicles of the fleet, in accordance with a first analytical mode. FIG. 5 shows an interconnection diagram of a network topology of a vehicle, in which various devices at nodes of the diagram may be endpoints for an attack path or nodes through which an attack path passes. FIG. 6 shows a chart of similarity scores between a reference vehicle and other vehicles of the fleet, in accordance with a second, more topological analytical mode, based upon network topologies of the sort depicted in FIG. 5. FIGS. 7A through 9 show flow charts for methods of establishing similarity scores, as discussed herein.

FIG. 1 illustrates a relationship 100 between a vehicle 110 and an associated record 120, the entries of which may contain a set of features 130 that are present in vehicle 110. Features 130 may include, for example, one or more devices of vehicle 110, such as one or more Electronic Control Units (ECU) of vehicle 110. Features 130 may also include other devices incorporated in the vehicle, such as sensors and actuators. Various devices included in features 130 may be capable of intercommunicating through one or more in-vehicle networks and/or interconnects, such as Controller Area Network (CAN) bus interconnects, Local Interconnect Network (LIN) interconnects, FlexRay interconnects, or any other vehicle networks and/or busses.

Features 130 may also include one or more applications and/or software programs of the devices incorporated in the vehicle. The applications may provide instructions and/or other control to the devices, and may include code at any of a variety of levels of a software stack (e.g., firmware, operating systems (OSes), and/or software). Each device may be associated with one or more applications, and record 120 may indicate associations between the applications of features 130 and the devices of features 130.

The entries of record 120 may also contain version information 140 pertaining to features 130. For example, record 120 may contain information indicating a type (e.g., make and/or model) of each device and/or a hardware version for each device (e.g., a revision identification, a manufacturing date, a series number, and/or a sub-model identification). Similarly, record 120 may contain information indicating a software version for each application (e.g., a revision identification and/or a release date).

FIG. 2 illustrates a relationship 200 between a vehicle 210, a record 220, a first vector 232, and a second vector 234. Vehicle 210 may be substantially similar to vehicle 110. Record 220 may have entries corresponding with a super-set of features encompassing all features, and all versions of each feature, that may be present across a fleet of vehicles. In other words, record 220 may have a number of entries encompassing all the distinct combinations of features (e.g., devices and applications) and version information (e.g., hardware type, hardware version, and software version) present in all the vehicles of the fleet. Accordingly, record 220 may include every possible feature of all the vehicles of the fleet, and every possible version of each feature.

A first vector 232 may be established for vehicle 210 based upon record 220. First vector 232 may have a number of elements equivalent to the number of vehicle features in record 220 (e.g., the number of feature/version combinations present across the fleet of vehicles). The elements of first vector 232 may respectively carry a set of parameters, expressed as binary values (e.g., values of "1" or "true" and values of "0" or "false"), which indicate the presence, within vehicle 210, of a corresponding sub-set of the vehicle features in record 220. Thus, first vector 232 may carry parameters indicating which features, and which versions of each feature, are present in vehicle 210.

A second vector 234 may also be established for vehicle 210. Second vector 234 may have a number of elements equivalent to the number of elements of first vector 232 (which, in turn, is equivalent to the number of feature/version combinations in record 220). The elements of second vector 234 may respectively carry a set of predetermined weights respectively corresponding with the vehicle features of record 220. The weights may include or may be, for example, security-related weights.

In some embodiments, second vector 234 may merely carry a set of predetermined weights applicable for vehicle 210, but other implementations are possible. For some embodiments, second vector 234 may carry a set of predetermined weights applicable for a subset of vehicles in the fleet, or for all the vehicles in the fleet.

Turning from FIG. 2 for a moment, FIG. 3 shows a block diagram of an internal network topology 300 of a vehicle (which may be substantially similar to vehicle 110 and/or vehicle 210). Topology 300 may comprise a central network portion 305, a first sub-network 310, a second sub-network 320, a third sub-network 330, a fourth sub-network 340, and a fifth sub-network 350.

Each of the sub-networks of topology 300 may couple a number of devices to central network portion 305. In some sub-networks, switch devices may connect individually to other devices by dedicated interconnect, such as in first sub-network 310 and second sub-network 320. In some sub-networks, domain gateway devices may connect to shared interconnect, which may then connect to other devices, such as in third sub-network 330, fourth sub-network 340, and fifth sub-network 350. Various devices of the sub-networks may be, or may include, ECUs. Some of the devices of the sub-networks may pertain, for example, to advanced driver assistance capabilities of the vehicle (e.g., Light Detection and Ranging (LIDAR) devices, Radio Detection and Ranging (RADAR) devices, cameras, various sensors, and/or various actuators). Other devices of the sub-networks may pertain to other capabilities, such as infotainment capabilities, a powertrain of the vehicle, a chassis of the vehicle, and/or a body of the vehicle Topology 300 may encompass a set of devices which may be part of a set of features of the corresponding vehicle. In the context of FIGS. 1 and 2, an internal network topology of either vehicle 110 or vehicle 210 may be substantially similar to topology 300.

Returning to FIG. 2, the devices of topology 300, and the software applications of topology 300, may be indicated as present in vehicle 210 by first vector 232. Moreover, the weights of second vector 234 may reflect the significance of each feature/version combination present in vehicle 210 (and potentially feature/version combinations present in other vehicles of the fleet) with respect to an over-arching metric by which the vehicles of the fleet may be analyzed, as discussed herein. In various embodiments, the metric may be safety, or security, or update suitability, for example.

The elements of first vector 232 may then be multiplied by the respectively corresponding elements of second vector 234 to create a vector of weighted presences for vehicle 210. The resulting vector of weighted presences may then have significance with respect to the over-arching metric by which the fleet is to be analyzed.

Since a fleet may include a very large number of vehicles, updates to the vehicles of the fleet for various purposes (for example, software-application updates) may be resource-intensive. The weighted presences may advantageously support prioritized management of updates to the fleet.

So, for example, the metric may be security, and the weights of second vector 234 may be predetermined security-related weights, e.g., values reflecting security scores for each feature/version combination. These security scores may be manually determined by a security expert, for example, or may be automatically produced. One or more devices (e.g., ECUs) may get security scores, or risk scores, from a security expert, which may relate to the probabilities of the one or more devices to be targets of attacks. For some embodiments, low-security feature/version combinations may have greater weights.

If there is an attack on one car in the fleet, the weights of second vector 234 may be established (or adjusted from default values, potentially) to indicate which feature/version combinations may be more vulnerable to the attack. A vector of weighted presences (e.g., of the set of feature/version combinations in record 220) may then be established for each vehicle in the fleet, including the attacked vehicle. In the subsequent analysis, the attacked vehicle may serve as a reference vehicle.

For a first analytical mode, a distance function of the vector of weighted presences of the attacked vehicle and the vector of weighted presences of another vehicle may be calculated for some portion of, or all of, the other vehicles in the fleet. The values of the distance functions (e.g., the distances between vehicles in a vector space) may in turn establish similarity scores between the attacked vehicle and the other vehicles of the fleet. The similarity scores of all vehicles in the fleet may optionally be normalized, or scaled (e.g., to a range between 0 and 1) for analysis. Although a similarity or similarity score between vehicles may be determined according to a distance between their vector representations as established by inner products, in various embodiments, a similarity or similarity score between vehicles may be determined according to a distance between their vector representations as established in a variety of other ways.

For example, FIG. 4 shows a chart 400 of similarity scores between a reference vehicle and other vehicles of the fleet, using the first analytical mode. Updates to address the attack mode may be made available (e.g., by a push rollout process and/or a pull rollout process) based upon a combination of the similarity score and the count of vehicles with that similarity score. Updates may preferentially be rolled out to vehicles with the highest similarity scores, for example, and in this way, updates for more vulnerable vehicles may be prioritized over updates less vulnerable vehicles. In some embodiments, updates may preferentially be rolled out to a certain percentage of the vehicles in the fleet.

For example, updates may preferentially be rolled out to vehicles with a similarity score of at least 0.9, or 0.8, or may preferentially be rolled out to the vehicles having similarity scores in the top ten percentiles (e.g., the most similar ten percent of the fleet). The use of these mechanisms and methods may advantageously automate much of the analysis to support update process, while the prioritization of updates on the basis of similarity scores may advantageously optimize the use of remote computing resources employed in the update process.

In various embodiments, substantially similar analyses may be conducted for other metrics, including for safety, or for update suitability (e.g., identification of old feature/version combinations, for general maintenance purposes). Similar analyses may be conducted for any other metric by which it may be desirable to prioritize updates to more-suitable portions of a vehicle fleet over less-suitable portions of a vehicle fleet.

A second analytical mode may take into account deeper similarities between vehicles. With regards to security metrics, for example, an attack may enter a vehicle's network topology through one of the vehicle's interfaces, which may be referred to herein as an attack surface. Having gained entry to the network topology, the attack may proceed along a particular route through the network from the attack surface to a target device (e.g., a target ECU).

However, network topologies may vary from vehicle to vehicle. Accordingly, in various scenarios, it may be advantageous to take into account not merely the similarities between vehicles features, but relationships between different devices within the network (e.g., topological relationships). For example, it may be advantageous to take into account similarities in potential paths between vehicles features that are identified as significant for a particular attack (e.g., paths between attack surfaces and target devices).

FIG. 5 shows an interconnection diagram for a network topology 500 of a vehicle network. Topology 500 encompasses a variety of devices, represented as nodes in the interconnection diagram. Some devices may present attack surfaces 510 (e.g., devices providing accessible interfaces), while other devices may present ECUs 520 capable of being targeted for attack. Attack surfaces may include, for example, diagnostic ports, or entertainment units (which may themselves include, or may themselves be, ECUs). Other ECUs may be potential target devices.

In various embodiments, a first portion of this analysis may list of potential attack-surface/target-device pairs within topology 500 may be generated. For example, topology 500 is depicted as having 3 attack surfaces and 18 target devices. Thus, there are a total of 54 attack-surface/target-device pairs.

The next portion of the analysis may consider the attack-surface/target-device pairs one at a time. An algorithm (such a Breadth First Search (BFS) algorithm) may be used to identify all possible routes between the attack surface and the target device of the pair. Once all the routes are identified, an attack vector for the attack-surface/target-device pair may be generated. The attack vector may have a number of elements equal to the number of nodes within topology 500 (e.g., the total number of attack surfaces and potential target devices). For example, the 3 attack surfaces and 18 target devices of topology 500 would lead to the vectors for each attack-surface/target-device pair having 21 elements. This may be a minimal case, which may apply which there is merely one feature per ECU (e.g., features which indicate whether particular hardware versions of particular ECUs exist or not). In various embodiments, for ECUs associated with multiple features (e.g., multiple applications and/or software programs), the various features of the ECUs may lead to the vectors having additional elements, up to and including an additional element for each feature of every ECU.

The value of each element of the attack vector may then be set to a weight that is inversely proportional to the number of hops between the attack-surface/target-device pair, along the shortest possible path. In FIG. 5, for example, when considering the paths between attack surface #2 of attack surfaces 510 and target ECU #13 of ECUs 520, the following weights may apply:

TABLE 1

Example weights by element for attack surface #2 and ECU #13

| element | weight |
|---|---|
| attack surfaces 510, #1 | 0.00 |
| attack surfaces 510, #2 | 0.50 |
| attack surfaces 510, #3 | 0.00 |
| target devices 520, #1 | 0.50 |
| target devices 520, #2 | 0.25 |
| target devices 520, #3 | 0.00 |
| target devices 520, #4 | 0.00 |
| target devices 520, #5 | 0.00 |
| target devices 520, #6 | 0.00 |
| target devices 520, #7 | 0.00 |
| target devices 520, #8 | 0.20 |
| target devices 520, #9 | 0.33 |
| target devices 520, #10 | 0.33 |
| target devices 520, #11 | 0.00 |
| target devices 520, #12 | 0.00 |
| target devices 520, #13 | 0.50 |
| target devices 520, #14 | 0.00 |
| target devices 520, #15 | 0.33 |
| target devices 520, #16 | 0.25 |
| target devices 520, #17 | 0.33 |
| target devices 520, #18 | 0.00 |

In some embodiments, individual attack vectors may be compared between a reference vehicle and vehicles within a fleet. As discussed herein, the values of the elements for the attack vector may be scaled by a predetermined weighting factor (e.g., a security-related weighting factor, whether manually or automatically determined). In comparing individual attack vectors for two different vehicles, a positive distance operator $D_{pos}$ as defined in equation 1 below may be used:

$$D_{pos}(\bar{u},\bar{v}) = \langle (\bar{u}-\bar{v}), [(\bar{u}-\bar{v}) > 0] \rangle \quad (1)$$

In accordance with equation 1, the value of the elements of vector u are subtracted from the values of the corresponding elements of vector $\bar{u}$. $D_{pos}$ may then be set equal to the sum of those differences, for the cases in which those differences are greater than zero.

$D_{pos}$ is therefore an asymmetrical operator, and the value to which it evaluates depends upon which vehicle's attack vector is $\bar{u}$ and which vehicle's attack vector is $\bar{u}$. This asymmetry may have various advantages. One advantage may be that differences between vehicles are not counted (or accounted for) twice. Since two vehicles may have different versions of a given vehicle feature, and since different versions of a given feature a may show up as distinct elements within each vehicle's attack vector, different versions of a vehicle feature would show up as a mathematical difference between more than one element of the attack vector. Having the differences included in the sum be greater than zero may lead to counting a different version of a vehicle feature a single time.

Another advantage may be that the analysis elides over vehicle features missing in a particular vehicle. Since the elements of a vehicle's attack vector may encompass vehicle features that are present within the fleet of vehicles, but are not present within a vehicle being analyzed, not including such features will permit the analysis to avoid penalizing a vehicle's similarity score on that basis. Yet another advantage may be that the asymmetry reflects real world situations in which there are differences between a first vehicle and a second vehicle.

In some embodiments, a set of attack vectors may be compared between a reference vehicle and vehicles within a fleet. In comparing a set of attack vectors for two different vehicles, the positive distance operator $D_{pos}$ of equation 1 may be used in determining a total distance, which may be a weighted average of all positive distances between all of the attack vectors in the set of attack vectors, as defined in equation 2 below.

$$D_{total} = \frac{\sum_{i,j}^{n_i n_j} D_{pos}(u_{ij}, v_{ij}) \cdot R_j}{\sum_{j}^{n_j} R_j} \quad (2)$$

Where i is an index indicating the attack surface, and j is an index indicating the target device. So, for example, in calculating $D_{total}$ for topology 500, the index i would iterate through the 3 attack surfaces, and the index j would iterate through the 18 target devices.

For two vehicles, or groups of vehicles, the similarity score across a set of attack vectors may then be in accordance with equation 3 below.

$$\text{similarity score between two vehicles} = 1 - \frac{D_{total}}{D_{max}} \quad (3)$$

Where $D_{max}$ may be calculated as an L1 norm of all the attack vectors of the reference vehicle.

FIG. 6 shows a chart 600 of similarity scores between a reference vehicle and other vehicles of the fleet, using the second analytical mode. In comparison with chart 400, the similarity scores of chart 600 are more tightly clustered. This may advantageously serve to further focus updates to a vehicle fleet, by permitting a more precise update prioritization (e.g., relative to specific attacks).

Once a prioritization has been established for updates to a fleet of vehicles, in some embodiments, the updates may be delivered via an over-the-air mechanism (e.g., via wireless transmission). For some embodiments, the updates may be made directly (e.g., as in a repair shop). In various embodiments, updates may be delivered in any appropriate manner.

In some embodiments, the mechanisms and methods disclosed herein may also receive dynamic inputs related to various current parameters of the vehicle fleet. These parameters may include safety and/or security events related to the geolocation of the vehicle and/or neighboring vehicles, intensity of vehicle usage, and so on. For some embodiments, a fleet of vehicles may be divided into clusters of vehicles with similar levels of targeted robustness to safety-related threats and/or security-related threats. In various embodiments, software updates may be delivered over-the-air and/or in repair shops.

The mechanisms and methods disclosed herein may also be applicable in contexts outside of vehicle fleets, in which deployed devices include hardware and/or software that may be susceptible to safety or security problems, such as with highly-distributed systems of connected devices. Some such systems may include medical equipment, smart grid units, "vehicle-to-everything" (V2X) road-side units, wearable units, home appliances, computer networks, and so on.

Figure 7A:
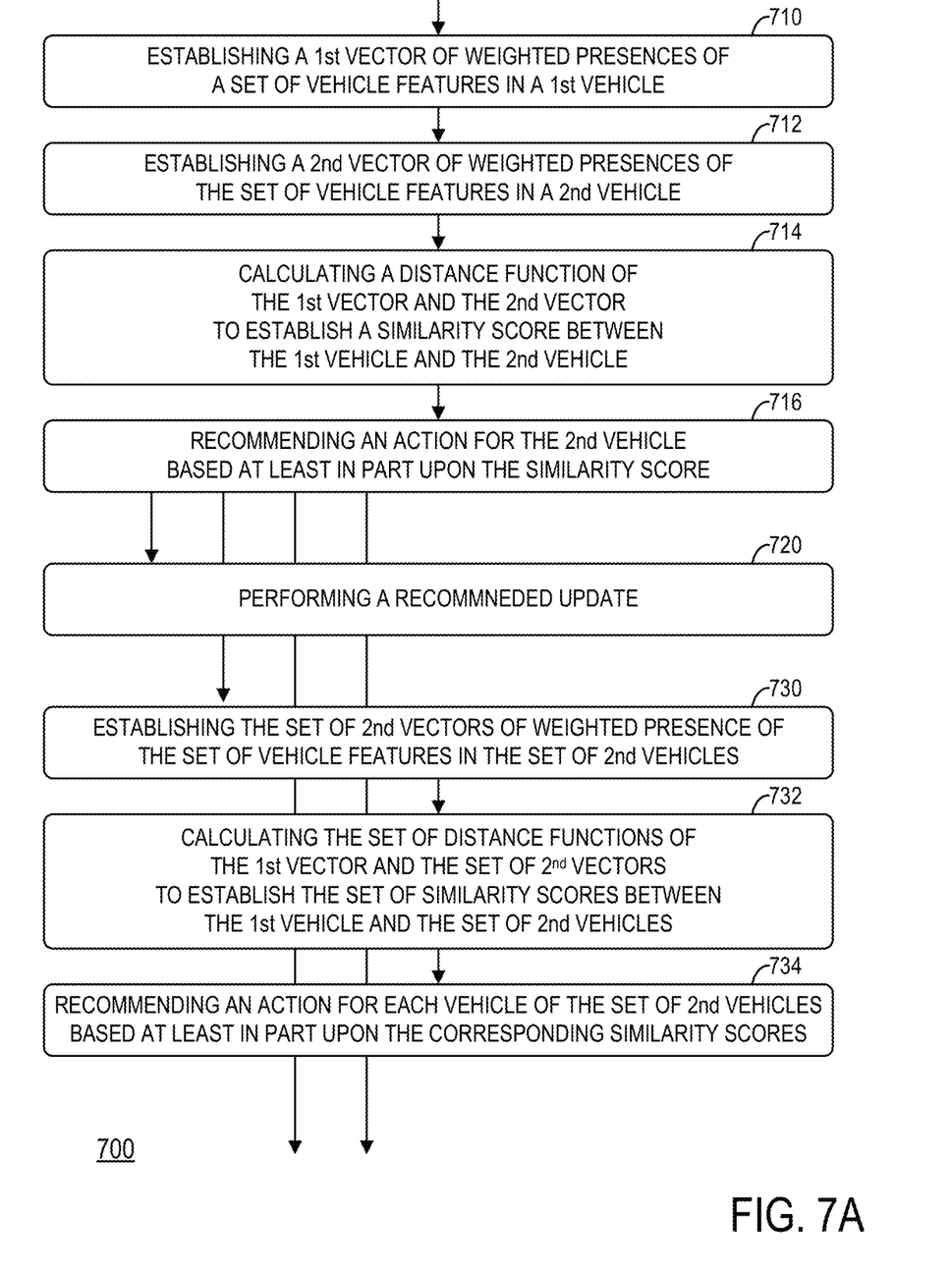
FIGS. 7A-7B show a flow chart for a method of establishing similarity scores among vehicles, in accordance with one or more embodiments of the present disclosure.
Figure 7B:
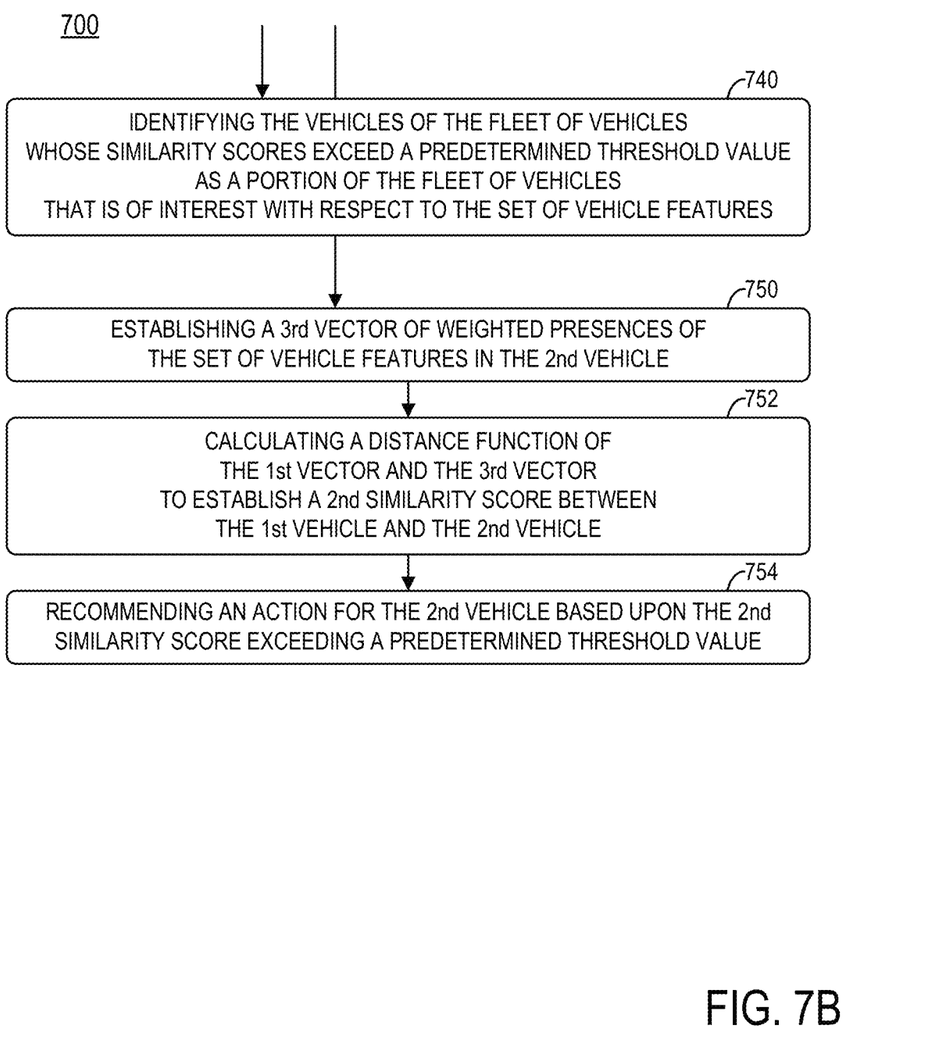

FIGS. 7A-7B show a flow chart for a method 700 of establishing similarity scores among vehicles. Method 700 may comprise an establishing 710, an establishing 712, a calculating 714, and a recommending 716. Method 700 may also comprise a performing 720, an establishing 730, a calculating 732, a recommending 734, an identifying 740, an establishing 750, a calculating 752, and/or a recommending 754.

In establishing 710, a first vector of weighted presences of a set of vehicle features in a first vehicle may be established. The set of vehicle features may be, for example, the superset of feature/version combinations discussed herein. In establishing 712, a second vector of weighted presences of the set of vehicle features in a second vehicle may be established. In calculating 714, a distance function of the first vector and the second vector may be calculated (as discussed herein, for example) to establish a similarity score between the first vehicle and the second vehicle. In recommending 716, an action (such as an update) may be recommended for the second vehicle based at least in part upon the similarity score.

In some embodiments, the establishment of weighted presences of vehicle features may include multiplying a set of parameters indicating a presence of each vehicle feature by a predetermined weight for the corresponding vehicle feature (as discussed herein). For some embodiments, the set of vehicle features may include one or more ECUs and/or one or more software applications. In some embodiments, weights corresponding with one or more software applications of the set of vehicle features may be predetermined security-related weights (e.g., weights determined manually by a security expert, or produced automatically). For some embodiments, the recommended action may include an update (e.g., a software update, a firmware update, a security patch, and so forth). In some embodiments, method 700 may comprise performing 720, in which the recommended update is performed.

In some embodiments, the second vehicle may be one of a set of second vehicles, the second vector may be one of a set of second vectors respectively corresponding with the set of second vehicles, the distance function may be one of a set of distance functions respectively corresponding with the set of second vectors, and the similarity score may be one of a set of similarity scores. For some embodiments, in establishing 730, the set of second vectors of weighted presences of the set of vehicle features in the set of second vehicles may be established. In calculating 732, the set of distance functions of the first vector and the set of second vectors may be calculated (as discussed herein) to establish the set of similarity scores between the first vehicle and the set of second vehicles. In recommending 734, an action (e.g., an update) may be recommended for one or more vehicles of the set of second vehicles based at least in part upon the corresponding similarity scores.

For some embodiments, the set of second vehicles may be a fleet of vehicles. In some embodiments, in identifying 740, the vehicles of the fleet of vehicles whose similarity scores exceed a predetermined threshold value may be identified as a portion of the fleet of vehicles that is of interest with respect to the set of vehicle features. That is, vehicles whose similarity scores exceed a predetermined threshold similarity score may be identified as being of interest with respect to the set of vehicle features. For some embodiments, the action (e.g., an update) may be recommended for the second vehicle based upon the similarity score exceeding a predetermined threshold value. In some embodiments, the set of vehicle features includes one or more possible attack paths between a set of attack entry points and a set of ECUs in a network architecture.

For some embodiments, the possible attack paths may be weighted based upon attack scores between the corresponding attack entry points and the corresponding ECUs. In various embodiments, an attack score may merely be related to a number of ECUs in the corresponding attack path (e.g., a number of hops). For example, an attack score may be inversely proportional to the number of ECUs in the path. However, the methods and mechanisms disclosed herein may employ different attack scores.

In some embodiments, an attack score for a path may represent a difficulty of performing an attack via that path. Attack scores may be established based on, for example, a number of hops (e.g., between an attack surface and a target ECU), a severity of one or more vulnerabilities of the path and/or along the path, and so on. For some embodiments, the possible attack paths may be weighted based on a reciprocal of the number of ECUs in the path (e.g., a number of hops), a difficulty of accessing the attack surface, a difficulty of overcoming or passing the various ECUs in the path, and so on.

In some embodiments, the similarity score may be a first similarity score. In some embodiments, in establishing 750, a third vector of weighted presences of the set of vehicle features in the second vehicle may be established. For some embodiments, in calculating 752, a distance function of the first vector and the third vector may be calculated (as discussed herein) to establish a second similarity score between the first vehicle and the second vehicle. In some embodiments, in recommending 754, an action for the second vehicle (e.g., an update) may be recommended based upon the similarity score exceeding a predetermined threshold value.

In various embodiments, method 700 may comprise a scheduling, in which actions (e.g., recommended actions) for one or more vehicles may be scheduled. In various embodiments, method 700 may comprise an updating, in which updates (e.g., recommended updates and/or scheduled updates) for one or more vehicles may be performed. For various embodiments, an action and/or update may be recommended by a first system or party, and the recommended action or update may be scheduled or performed by a second system or party different than the first.

Figure 8:
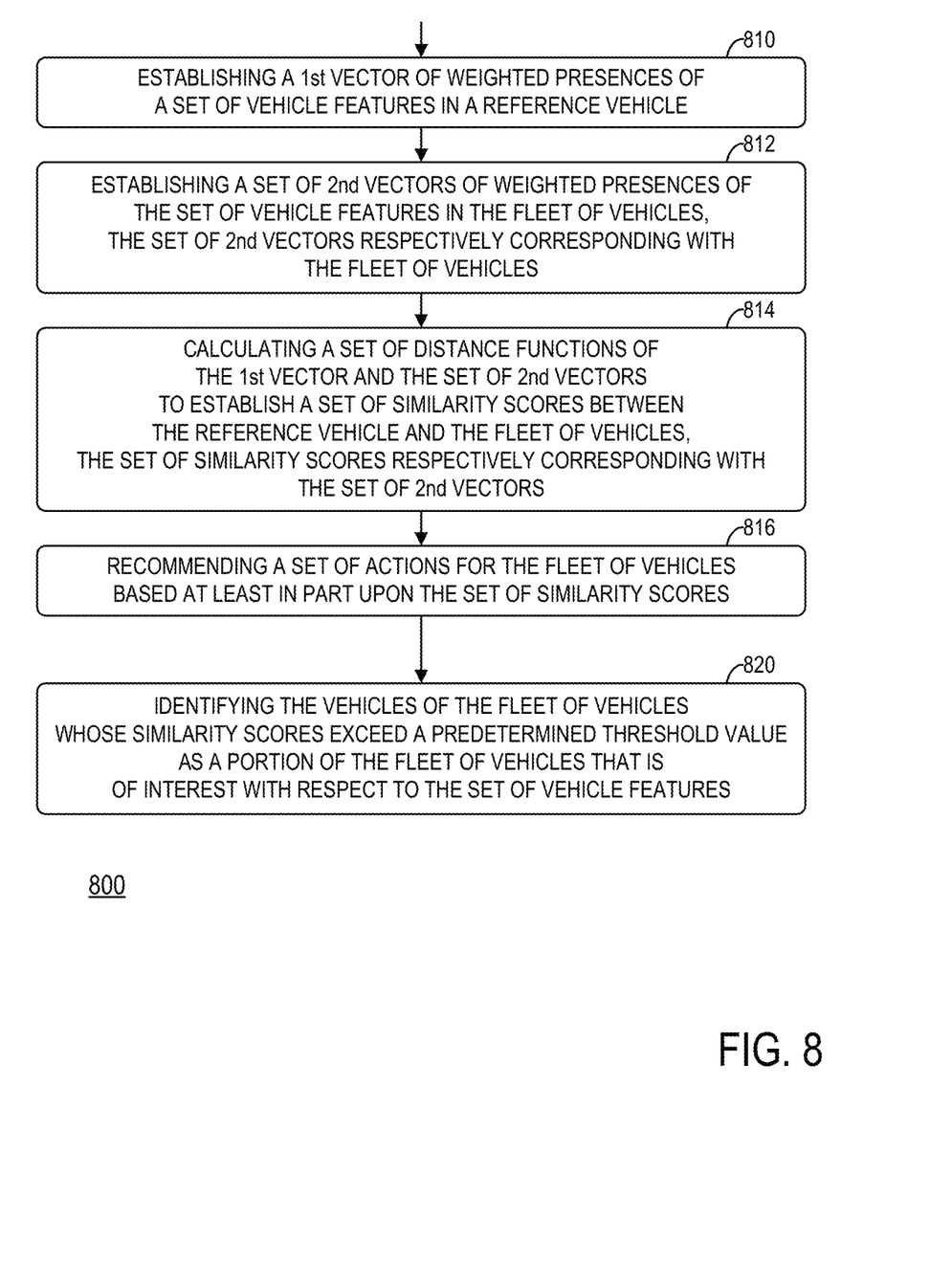
FIG. 8 shows a flow chart for a method of establishing similarity scores among vehicles within a fleet of vehicles, based on the first analytical mode, in accordance with one or more embodiments of the present disclosure.

FIG. 8 shows a flow chart for a method 800 of establishing similarity scores among vehicles within a fleet of vehicles, in accordance with the first analytical mode. Method 800 may comprise an establishing 810, an establishing 812, a calculating 814, and a recommending 816. In some embodiments, method 800 may comprise an identifying 820.

In establishing 810, a first vector of weighted presences of a set of vehicle features in a reference vehicle may be established. In establishing 812, a set of second vectors of weighted presences of the set of vehicle features in the fleet of vehicles may be established, the set of second vectors respectively corresponding with the fleet of vehicles. In calculating 814, a set of distance functions of the first vector and the set of second vectors may be calculated (as discussed herein) to establish a set of similarity scores between the reference vehicle and the fleet of vehicles, the set of similarity scores respectively corresponding with the set of second vectors. In recommending 816, a set of actions (e.g., updates) for the fleet of vehicles may be recommended based at least in part upon the set of similarity scores.

In some embodiments, the set of vehicle features may include one or more ECUs and/or one or more software applications, and weights corresponding with one or more software applications of the set of vehicle features are predetermined security-related weights. For some embodiments, the recommended action may include an update (e.g., a software update, a firmware update, a security patch, and so forth).

For some embodiments, in identifying 820, the vehicles of the fleet of vehicles whose similarity scores exceed a predetermined threshold value may be identified as a portion of the fleet of vehicles that is of interest with respect to the set of vehicle features.

In various embodiments, method 800 may comprise a scheduling, in which actions (e.g., recommended actions) for one or more vehicles may be scheduled. In various embodiments, method 800 may comprise an updating, in which updates (e.g., recommended updates and/or scheduled updates) for one or more vehicles may be performed. For various embodiments, an action and/or update may be recommended by a first system or party, and the recommended action or update may be scheduled or performed by a second system or party different than the first.

Figure 9:
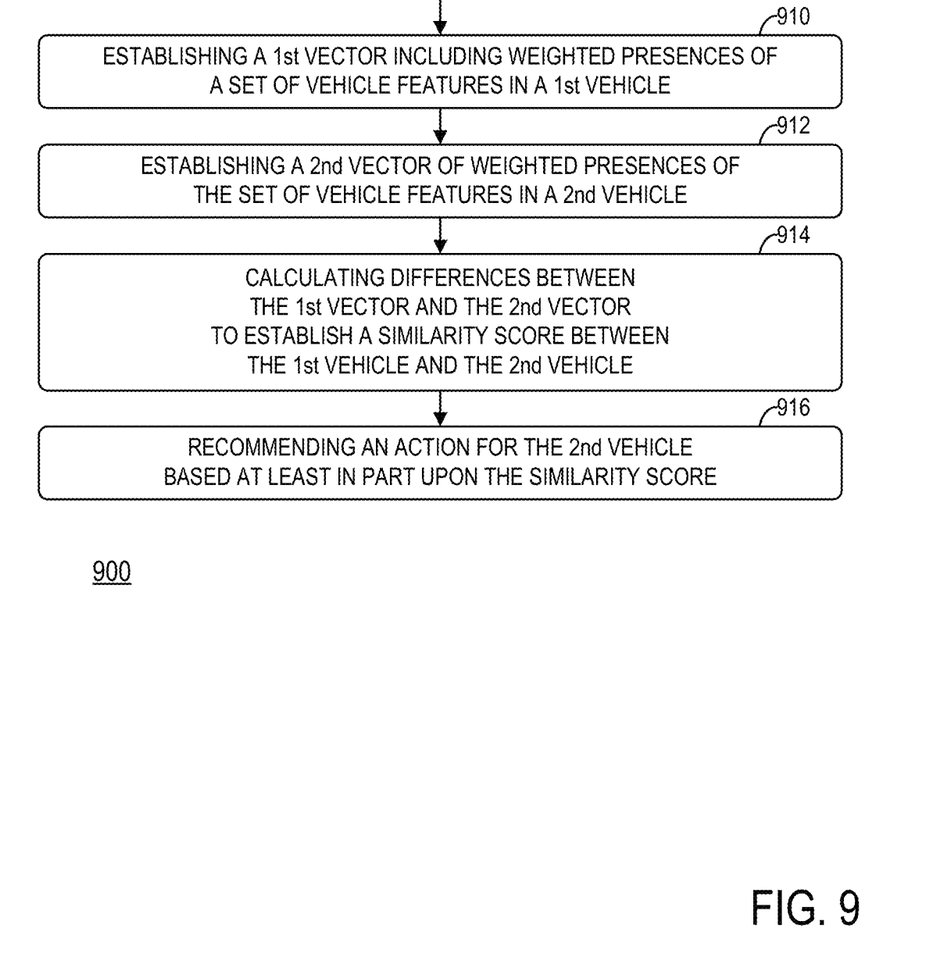
FIG. 9 shows a flow chart for a method of establishing similarity scores among vehicles within a fleet of vehicles, based on the second analytical mode, in accordance with one or more embodiments of the present disclosure.

FIG. 9 shows a flow chart for a method 900 of establishing similarity scores among vehicles within a fleet of vehicles, in accordance with the second analytical mode. Method 900 may comprise an establishing 910, an establishing 912, a calculating 914, and a recommending 916.

In establishing 910, a first vector including weighted presences of a set of vehicle features in a first vehicle may be established. In establishing 912, a second vector of weighted presences of the set of vehicle features in a second vehicle may be established. In calculating 914, differences between the first vector and the second vector may be calculated (as discussed herein) to establish a similarity score between the first vehicle and the second vehicle. In recommending 916, an action may be recommended for the second vehicle based at least in part upon the similarity score.

For some embodiments, the set of vehicle features includes one or more possible attack paths between a set of attack entry points and a set of ECUs. In some embodiments, the first vehicle may be a reference vehicle, and/or the second vehicle may be one of a fleet of vehicles. For some embodiments, the possible attack paths may be weighted based upon a number of hops between the corresponding attack entry point and the corresponding ECU.

In various embodiments, method 900 may comprise a scheduling, in which actions (e.g., recommended actions) for one or more vehicles may be scheduled. In various embodiments, method 900 may comprise an updating, in which updates (e.g., recommended updates and/or scheduled updates) for one or more vehicles may be performed. For various embodiments, an action and/or update may be recommended by a first system or party, and the recommended action or update may be scheduled or performed by a second system or party different than the first.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as one or more processors executing instructions stored on one or more memory devices. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and subcombinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. Terms such as "first," "second," "third," and so on are used merely as labels, and are not intended to impose numerical requirements or a particular positional order on their objects. The following claims particularly point out subject matter from the above disclosure that is regarded as novel and non-obvious.

In a first approach to the methods and systems discussed herein, a first example of a method comprises: establishing a first vector of weighted presences of a set of vehicle features in a first vehicle; establishing a second vector of weighted presences of the set of vehicle features in a second vehicle; calculating a distance function of the first vector and the second vector to establish a similarity score between the first vehicle and the second vehicle; and recommending an action for the second vehicle based at least in part upon the similarity score. In a second example building off of the first example, the establishment of weighted presences of vehicle features includes multiplying a set of parameters indicating a presence of each vehicle feature by a predetermined weight for the corresponding vehicle feature. In a third example building off of either the first example or the second example, the set of vehicle features includes at least one of: one or more ECUs; and one or more software applications. In a fourth example building off of the third example, weights corresponding with one or more software applications of the set of vehicle features are predetermined security-related weights. In a fifth example building off of any of the first example through the fourth example, the recommended action includes an update. In a sixth example building off of the fifth example, the method further comprises: performing the recommended update. In a seventh example building off of any of the first example through the sixth example, the second vehicle is one of a set of second vehicles, the second vector is one of a set of second vectors respectively corresponding with the set of second vehicles, the distance function is one of a set of distance functions respectively corresponding with the set of second vectors, and the similarity score is one of a set of similarity scores, and the method further comprises: establishing the set of second vectors of weighted presences of the set of vehicle features in the set of second vehicles; calculating the set of distance functions of the first vector and the set of second vectors to establish the set of similarity scores between the first vehicle and the set of second vehicles; and recommending an action for one or more vehicles of the set of second vehicles based at least in part upon the corresponding similarity scores. In an eighth example building off of the seventh example, the set of second vehicles is a fleet of vehicles. In a ninth example building off of the eighth example, the method further comprises: identifying the vehicles of the fleet of vehicles whose similarity scores exceed a predetermined threshold value as a portion of the fleet of vehicles that is of interest with respect to the set of vehicle features. In a tenth example building off of any of the first example through the ninth example, the action is recommended for the second vehicle based upon the similarity score exceeding a predetermined threshold value. In an eleventh example building off of any of the first example through the tenth example, the set of vehicle features includes one or more possible attack paths between a set of attack entry points and a set of ECUs in a network architecture. In a twelfth example building off of the eleventh example, the possible attack paths are weighted based upon a number of hops between the corresponding attack entry point and the corresponding ECU. In a thirteenth example building off of the eleventh example, wherein the similarity score is a first similarity score, the method further comprises: establishing a third vector of weighted presences of the set of vehicle features in the second vehicle; calculating a distance function of the first vector and the third vector to establish a second similarity score between the first vehicle and the second vehicle; and recommending an action for the second vehicle based upon the similarity score exceeding a predetermined threshold value. The technical effect of implementing such methods is that updates to a plurality of vehicles may advantageously be recommended based on which vehicles are most similar to a reference vehicle design for a particular metric (e.g., security, safety, and so on).

In a second approach to the methods and systems discussed herein, a first example of a method of managing a fleet of vehicles comprises: establishing a first vector of weighted presences of a set of vehicle features in a reference vehicle; establishing a set of second vectors of weighted presences of the set of vehicle features in the fleet of vehicles, the set of second vectors respectively corresponding with the fleet of vehicles; calculating a set of distance functions of the first vector and the set of second vectors to establish a set of similarity scores between the reference vehicle and the fleet of vehicles, the set of similarity scores respectively corresponding with the set of second vectors; and recommending a set of actions for the fleet of vehicles based at least in part upon the set of similarity scores. In a second example building off of the first example, the set of vehicle features includes at least one of: one or more ECUs; and one or more software applications; and weights corresponding with one or more software applications of the set of vehicle features are predetermined security-related weights. In a third example building off of either the first example or the second example, the recommended action includes an update. In a fourth example building off of the third example, the method further comprises: identifying the vehicles of the fleet of vehicles whose similarity scores exceed a predetermined threshold value as a portion of the fleet of vehicles that is of interest with respect to the set of vehicle features. The technical effect of implementing such methods is that updates to a fleet of vehicles may advantageously be recommended and performed based on which vehicles in the fleet are most similar to a reference vehicle design for a particular metric (e.g., security, safety, and so on).

In a third approach to the methods and systems discussed herein, a first example of a method of managing vehicles comprises: establishing a first vector including weighted presences of a set of vehicle features in a first vehicle; establishing a second vector of weighted presences of the set of vehicle features in a second vehicle; calculating differences between the first vector and the second vector to establish a similarity score between the first vehicle and the second vehicle; and recommending an action for the second vehicle based at least in part upon the similarity score, wherein the set of vehicle features includes one or more possible attack paths between a set of attack entry points and a set of ECUs. In a second example building off of the first example, the first vehicle is a reference vehicle; and the second vehicle is one of a fleet of vehicles. In a third example building off of the second example, the possible attack paths are weighted based upon a number of hops between the corresponding attack entry point and the corresponding ECU.

The technical effect of implementing such methods is that updates to a plurality of vehicles may advantageously be recommended based on which vehicles have attack paths that are most similar to relevant attack paths of a reference vehicle design for a particular metric (e.g., security, safety, and so on).

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. Terms such as "first," "second," "third," and so on are used merely as labels, and are not intended to impose numerical requirements or a particular positional order on their objects. The following claims particularly point out subject matter from the above disclosure that is regarded as novel and non-obvious.

As used herein, terminology in which "an embodiment," "some embodiments," or "various embodiments" are referenced signify that the associated features, structures, or characteristics being described are in at least some embodiments, but are not necessarily in all embodiments. Moreover, the various appearances of such terminology do not necessarily all refer to the same embodiments. Also, terminology in which elements are presented in a list using "and/or" language means any combination of the listed elements. For example, "A, B, and/or C" may mean any of the following: A alone; B alone; C alone; A and B; A and C; B and C; or A, B, and C.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   establishing a first vector of weighted presences of a set of vehicle features in a first vehicle;
   establishing a second vector of weighted presences of the set of vehicle features in a second vehicle;
   calculating a distance function between the first vector and the second vector to establish a similarity score between the first vehicle and the second vehicle; and
   recommending an action for the second vehicle based at least in part upon the similarity score,
   wherein the set of vehicle features includes one or more attack paths that are present within a network topology of the first vehicle, the network topology of the first vehicle having a set of attack surfaces of the first vehicle and a set of Electronic Control Units (ECUs) of the first vehicle;
   wherein the set of vehicle features includes one or more attack paths that are not present within a network topology of the second vehicle;
   wherein each of the one or more attack paths of the network topology of the first vehicle is between an attack surface of the set of attack surfaces of the network topology of the first vehicle, and an endpoint at an ECU of the set of ECUs of the first vehicle;
   wherein each of the one or more attack paths of the network topology of the first vehicle is weighted based upon an attack score; and
   wherein the attack score of each of the one or more attack paths of the network topology of the first vehicle is based on at least one of: an inverse proportionality to a number of ECUs in the attack path; a number of hops between the attack surface of the attack path and the endpoint of the attack path; a severity of one or more vulnerabilities of or along the attack path; a difficulty of accessing the attack surface of the attack path; and a difficulty of overcoming or passing one or more ECUs in the attack path.

2. The method of claim 1,
   wherein the establishment of weighted presences of the set of vehicle features includes multiplying a set of parameters indicating a presence of each vehicle feature by a predetermined weight for the vehicle feature.

3. The method of claim 1,
   wherein the set of vehicle features includes one or more software applications.

4. The method of claim 3,
   wherein weights corresponding with the one or more software applications of the set of vehicle features are predetermined security-related weights.

5. The method of claim 1,
   wherein the recommended action includes an update.

6. The method of claim 5 further comprising:
   performing the recommended update.

7. The method of claim 1,
   wherein the second vehicle is one of a set of second vehicles, the second vector is one of a set of second vectors respectively corresponding with the set of second vehicles, the distance function is one of a set of distance functions respectively corresponding with the set of second vectors, and the similarity score is one of a set of similarity scores, the method further comprising:
   establishing the set of second vectors of weighted presences in the set of second vehicles of the set of vehicle features;

calculating the set of distance functions between the first vector and each of the set of second vectors to establish the set of similarity scores between the first vehicle and the set of second vehicles; and recommending an action for one or more vehicles of the set of second vehicles based at least in part upon the set of similarity scores.

8. The method of claim 7,
wherein the set of second vehicles is a fleet of vehicles.

9. The method of claim 8 further comprising:
identifying vehicles of the fleet of vehicles with similarity scores exceeding a predetermined threshold value as a portion of the fleet of vehicles that is of interest with respect to the set of vehicle features.

10. The method of claim 1,
wherein the action is recommended for the second vehicle based upon the similarity score exceeding a predetermined threshold value.

11. The method of claim 1,
wherein the similarity score is a first similarity score, the method further comprising:
establishing a third vector of weighted presences in the second vehicle of the set of vehicle features;
calculating a distance function between the first vector and the third vector to establish a second similarity score between the first vehicle and the second vehicle; and
recommending an action for the second vehicle based upon the second similarity score exceeding a predetermined threshold value.

12. A method of managing a fleet of vehicles, the method comprising:
establishing a first vector of weighted presences of a set of vehicle features in a reference vehicle;
establishing a set of second vectors of weighted presences of the set of vehicle features in the fleet of vehicles, the set of second vectors respectively corresponding with the fleet of vehicles;
calculating a set of distance functions between the first vector and the set of second vectors to establish a set of similarity scores between the reference vehicle and the fleet of vehicles, the set of similarity scores respectively corresponding with the set of second vectors; and
recommending a set of actions for the fleet of vehicles based at least in part upon the set of similarity scores,
wherein the set of vehicle features includes a super-set of attack paths across the fleet of vehicles, including a set of attack paths extending between an attack surface of a network topology for the reference vehicle and an Electronic Control Unit (ECU) of the network topology for the reference vehicle;
wherein each attack path of the set of attack paths extending between the attack surface of the network topology for the reference vehicle and the ECU of the network topology for the reference vehicle is weighted based upon an attack score; and
wherein the attack score of each attack path of the set of attack paths is based on at least one of: an inverse proportionality to a number of ECUs in the attack path; a number of hops between the attack surface of the attack path and an endpoint of the attack path; a severity of one or more vulnerabilities of or along the attack path; a difficulty of accessing the attack surface of the attack path; and a difficulty of overcoming or passing one or more ECUs in the attack path.

13. The method of claim 12,
wherein the set of vehicle features includes one or more software applications; and
wherein weights corresponding with the one or more software applications of the set of vehicle features are predetermined security-related weights.

14. The method of claim 12,
wherein the recommended set of actions includes an update.

15. The method of claim 14 further comprising:
identifying vehicles of the fleet of vehicles with similarity scores exceeding a predetermined threshold value as a portion of the fleet of vehicles that is of interest with respect to the set of vehicle features.

16. A method of managing vehicles, the method comprising:
establishing a first vector including weighted presences of a set of vehicle features in a first vehicle, the first vehicle being one of a fleet of vehicles;
establishing a second vector of weighted presences of the set of vehicle features in a second vehicle, the second vehicle being one of the fleet of vehicles;
calculating differences between the first vector and the second vector to establish a similarity score between the first vehicle and the second vehicle; and
recommending an action for the second vehicle based at least in part upon the similarity score,
wherein the set of vehicle features includes a set of attack paths between attack-surface/target-device pairs within a network topology of the first vehicle;
wherein the set of attack paths includes attack paths present across all vehicles of the fleet of vehicles;
wherein each attack path of the set of attack paths is between an attack surface within the network topology of the first vehicle and an Electronic Control Unit (ECU) within the network topology of the first vehicle;
wherein each attack path of the set of attack paths is weighted based upon an attack score; and
wherein the attack score of each attack path of the set of attack paths is based on at least one of: an inverse proportionality to a number of ECUs in the attack path; a number of hops between the attack surface of the attack path and an endpoint of the attack path; a severity of one or more vulnerabilities of or along the attack path; a difficulty of accessing the attack surface of the attack path; and a difficulty of overcoming or passing one or more ECUs in the attack path.

17. The method of claim 16,
wherein the first vehicle is a reference vehicle for the fleet of vehicles.

18. The method of claim 17,
wherein the set of attack paths includes attack paths that are present within the second vehicle; and
wherein the set of attack paths includes attack paths that are not present within the second vehicle.

* * * * *